Patented July 4, 1950

2,514,268

UNITED STATES PATENT OFFICE 2,514,268

AMINOPLASTS CONTAINING SILICON

Henry A. Walter, Longmeadow, Mass., assignor to Monsanto Chemical Company, St. Louis, Mo., a corporation of Delaware No Drawing. Application May 23, 1947, Serial No. 750,177

3 Claims. (Cl. 260—17.3)

This invention relates to thermosetting resins. More particularly, the invention relates to aminoplasts containing silicon.

Among the newer synthetic resins developed for treatment of paper and textiles are the various aminoplasts such as urea and melamine resins. The aminoplasts are thermosetting resins which have been used successfully to shrinkproof and creaseproof textiles and increase the wet strength of papers. Various attempts have been made to modify the aminoplasts to render them valuable as fireproofing impregnants, but results have been mediocre.

One object of this invention is to provide new thermosetting resins.

A further object is to provide aminoplasts modified with silicon.

Another object is to provide fireproofing resins for textile and paper treatment.

These and other objects are attained by preparing silicon oxyamides and then reacting the silicon oxyamides with aldehydes.

The following examples are given in illustration and are not intended as limitations on the scope of this invention. Where parts are mentioned, they are parts by weight.

Example I 100 parts of dry silicon tetrachloride were mixed slowly at room temperature with 94 parts of dry ammonium bicarbonate. The mixture was agitated gently over a period of about 12 hours at room temperature during which hydrogen chloride was evolved. The product was a silicon oxyamide in the form of a fine white powder.

Example II 100 parts of a mixture of silicon oxychlorides having a boiling point ranging from 100–200° C. were dissolved in 500 parts of dry benzene. Dry ammonia gas was bubbled through the solution to obtain a white precipitate. Ammonia was passed through the solution until no further precipitate was formed. The white precipitate was recovered by filtration and was found on analysis to be a silicon oxyamide.

Example III 100 parts of the silicon oxyamide made as shown in Example I were reacted with 60 parts of formaldehyde at a pH of about 8–9. The formaldehyde was used in the form of a 37% aqueous solution. The reaction was carried out at reflux temperature at atmospheric pressure for about 10–20 minutes to obtain a water solution of a fusible resin. The resin obtained by evaporation of the water was clear and somewhat brittle. A 10% solids solution of the resin in water was used to impregnate kraft paper. Excess water was driven off and the resin was cured by heating the impregnated paper at about 150° C. for 30 minutes. The treated paper had a high wet strength and would not support combustion.

Example IV 100 parts of a silicon oxyamide as made by the process of Example II were slurried in water and reacted with 243 parts of formalin (37% formaldehyde) at a pH of about 8–9 and at reflux temperature at atmospheric pressure for about 10–20 minutes. The product was an aqueous solution of a tri-methylol derivative of the silicon oxyamide. Water was removed by evaporation under reduced pressure to produce a water-soluble clear resin. A 10% solids solution of the resin in water was used to impregnate kraft paper. After curing the resin at about 140° C. for 40 minutes, the treated paper would not support combustion and had a high wet strength.

The silicon oxyamides may be made by the reaction of the halogen derivatives of silicon such as the silicon fluorides, chlorides, bromides, iodides, oxyhalides, especially the oxychlorides and halogenated silicon ethers, with compounds such as ammonia, ammonium salts of weak organic acids, and amino compounds including amides, amines, urea, thiourea, hydrazines, dicyandiamide, aminotriazines, e. g. melamine, etc. The reaction should be carried out under anhydrous conditions with due care being taken to prevent too rapid a reaction. If desired, the halogen derivatives of silicon may be dissolved in an inert solvent such as benzene, toluene, xylene, etc. and the ammonia, ammonium salt or amino compounds bubbled through or added slowly to the solution.

The silicon oxyamides are obtained as white powders which in most cases are slightly soluble in water and more completely soluble in the lower alcohols. No catalyst is needed to prepare them.

The amount of ammonia, ammonium salt or amino compound to be used is generally a mol equivalent of the number of halogen atoms available on the halogen derivative of silicon. For some purposes, it may be desirable to retain some of the halogen in the final compound, in which case as little as one mol of ammonia, ammonium salt, or amino compound per mol of halogenated silicon compound may be used.

The silicon oxyamides may be reacted with aldehydes or a mixture of aldehydes to obtain fusible resins which may be cured to an insoluble, infusible state by the use of elevated temperatures ranging from about 100 to about 200° C. with or without a catalyst. Among the aldehydes which may be used are formaldehyde, acetaldehyde, butyraldehyde, octaldehyde, benzaldehyde, cinnamaldehyde, crotonaldehyde, acrolein, methacrolein, furfural, etc. The amount of aldehyde used will depend on the number of hydrogen atoms attached to nitrogen which are present in the silicon oxyamide. From 1 to 4 or more mols of aldehyde may be used per mol of silicon oxyamide.

The silicon oxyamide-aldehyde resins are soluble in water and alcohols. They may be easily cured to the insoluble, infusible state at temperatures of 100–200° C. without the use of catalysts. Acid curing catalysts such as sulfonic acids may be used if desired.

Various conventional additives may be incorporated in the resins in the fusible state, including pigments, fillers, dyes, lubricants, etc.

The resins of this invention are particularly useful for treating paper and textiles to render them substantially fireproof. They may most easily be applied from an aqueous solution by such conventional methods as spraying, dipping, roll coating, etc. They substantially increase the wet strength of paper and render textile fabrics shrinkproof and creaseproof.

It is obvious that many variations may be made in the processes and products of this invention without departing from the spirit and scope thereof as defined by the appended claims.

What is claimed is:

1. A thermosetting resin comprising a condensation product of an aldehyde and a silicon oxyamide prepared by the reaction at room temperature between a compound taken from the group consisting of silicon halides, silicon oxyhalides and halogenated silicon ethers, with a compound taken from the group consisting of ammonia, ammonium salts of weak organic acids and nontertiary amino compounds, at least one of said reactants containing oxygen.

2. A thermosetting resin as in claim 1 wherein the aldehyde is formaldehyde.

3. A substantially fireproof paper product comprising paper impregnated with a thermosetting resin comprising a condensation product of an aldehyde and a silicon oxyamide prepared by the reaction at room temperature of a compound taken from the group consisting of silicon halides, silicon oxyhalides and halogenated silicon ethers with a compound taken from the group consisting of ammonia, ammonium salts of weak organic acids and non-tertiary amino compounds, at least one of said reactants containing oxygen.

HENRY A. WALTER.

REFERENCES CITED

The following references are of record in the file of this patent:

UNITED STATES PATENTS

| Number | Name | Date |
|---|---|---|
| 2,415,017 | MacKenzie | Jan. 28, 1947 |